(12) United States Patent
Watson

(10) Patent No.: US 8,434,946 B2
(45) Date of Patent: May 7, 2013

(54) SYSTEM, METHOD, AND APPARATUS FOR HOLDING A TRACK TO A BASE

(75) Inventor: Nigel S. Watson, Martinez, CA (US)

(73) Assignee: Bishop-Wisecarver Corporation, Pittsburg, CA (US)

( * ) Notice: Subject to any disclaimer, the term of this patent is extended or adjusted under 35 U.S.C. 154(b) by 609 days.

(21) Appl. No.: 12/643,785

(22) Filed: Dec. 21, 2009

(65) Prior Publication Data

US 2010/0150484 A1  Jun. 17, 2010

Related U.S. Application Data

(63) Continuation-in-part of application No. 12/260,754, filed on Oct. 29, 2008.

(51) Int. Cl.
*F16C 29/04*  (2006.01)
*F16B 2/12*  (2006.01)
*B25G 3/20*  (2006.01)

(52) U.S. Cl.
USPC ................... 384/55; 384/58; 403/373

(58) Field of Classification Search ......... 385/50, 385/53–55, 57, 58–59; 403/373, 381; 248/307, 248/313; 384/50, 53–55, 57, 58–59
See application file for complete search history.

(56) References Cited

U.S. PATENT DOCUMENTS

| | | | |
|---|---|---|---|
| 1,470,090 A | 10/1923 | Manning | |
| 1,500,118 A * | 7/1924 | Ellis | 105/4.1 |
| 3,210,716 A * | 10/1965 | Meacham | 411/103 |
| 3,661,431 A | 5/1972 | Wisecarver | |
| 3,848,388 A | 11/1974 | Bretche | |
| 3,893,271 A * | 7/1975 | Kotlarz | 52/168 |
| 4,057,312 A * | 11/1977 | Hagermo | 439/431 |
| 4,497,148 A * | 2/1985 | Lopez | 52/126.3 |
| 4,694,531 A | 9/1987 | Foy | |
| 4,826,438 A * | 5/1989 | Torres | 434/219 |
| 5,145,418 A * | 9/1992 | Moranski et al. | 439/716 |
| 5,482,026 A | 1/1996 | Russell | |
| 5,513,916 A | 5/1996 | Takei | |
| 5,794,901 A * | 8/1998 | Sigel | 248/221.11 |
| 5,833,417 A * | 11/1998 | Sargent et al. | 411/85 |
| 5,950,773 A | 9/1999 | Ito | |

(Continued)

FOREIGN PATENT DOCUMENTS

| | | |
|---|---|---|
| DE | 4109286 C2 | 10/1994 |
| EP | 0258714 B1 | 6/1990 |
| WO | WO-02/38473 | 5/2002 |

OTHER PUBLICATIONS

International Search Report and Written Opinion, mailed Apr. 13, 2010, for related PCT application No. PCT/US2009/069289, 9 pages.
"Industrial Profile Systems", Catalog 1816, Linear Applications, Parker Automation, Parker Hannifin Corporation, 2002, 148-173.

(Continued)

*Primary Examiner* — Marcus Charles
(74) *Attorney, Agent, or Firm* — Michael A. Glenn; Glenn Patent Group

(57) ABSTRACT

Bolt-on clamp extrusions for fastening a track to support base extrusion for providing customers with a simple-to-assemble, customizable, reconfigurable, and user-friendly solution for reliable linear motion track assembly. A back-to-back track configuration provides a low-profile track assembly. Custom made base extrusions include deformable fingers disposed in the slot to ensure proper fit despite a variance in track size.

13 Claims, 15 Drawing Sheets

U.S. PATENT DOCUMENTS

| | | | | |
|---|---|---|---|---|
| 6,484,997 | B1 * | 11/2002 | Edwards et al. | 248/223.41 |
| 6,634,149 | B2 * | 10/2003 | Cates et al. | 52/283 |
| 6,746,055 | B1 | 6/2004 | Wood et al. | |
| 6,993,875 | B2 * | 2/2006 | Rudduck | 52/474 |
| 7,163,178 | B2 * | 1/2007 | Ricaud | 248/503.1 |
| 2009/0226122 | A1 | 9/2009 | Schroeder | |

OTHER PUBLICATIONS

"Integral V Linear Guide: Snap-In Series", PSC Linear, Jul. 18, 2008, 2.

"DualVee Motion Technology", Catalog: Components, Technical Specifications, Aug. 2007, 32 pages.

* cited by examiner

SYSTEM, METHOD, AND APPARATUS FOR HOLDING A TRACK TO A BASE

CROSS REFERENCE TO RELATED APPLICATIONS

This application is a continuation-in-part of U.S. patent application Ser. No. 12/260,754 entitled "PRESS FITTING INTERFACE FOR HOLDING A TRACK TO AN EXTRUSION WITHOUT THE USE OF FASTENERS; AND METHODS FOR USING THE SAME", filed Oct. 29, 2008, which is incorporated herewith in its entirety by the reference thereto.

BACKGROUND OF THE INVENTION

1. Technical Field

The invention relates generally to assembling a linear track in a guided motion system. In particular, the invention relates to a track assembly that supports a quick and easy method of assembly of linear tracks to standard base extrusions.

2. Description of the Prior Art

In manufacturing processes and within manufactured capital goods themselves, precise and repeatable motion is useful and often essential. For example, in manufacturing processes ranging from machining to textiles to electronics, tool heads or other items move back and forth and must do so precisely and repeatedly over enormous numbers of cycles. In another example, specimens and instrumentation move relative to each other within laboratory analytic devices to collect data on the samples and must do so precisely and repeatedly.

Guide wheels attached to support bases and riding on rails are one class of guided motion technology that provides precise and repeatable kinematics. For example, U.S. Pat. No. 3,661,431 discloses guide wheels and tracks in which guide wheels cooperate with rails such that the guide wheels may move along the rails.

An exemplary track used in guided motion application is shown in FIG. 1. FIG. 1 illustrates an exploded view of a guided motion apparatus 100 as known in the prior art. FIG. 1 shows a "Vee" edge track 120 and the DualVee® guide wheel 110 both manufactured by Bishop-Wisecarver Corporation. The track 120 is coupled with a support base 130. In preferred embodiments of the invention, the support base 130 comprises an extrusion.

Known support bases are typically available in a standard sizes and configurations. For example, the extrusion 130 shown in FIG. 1 is a representation of a standard aluminum extrusion support base manufactured by Parker Hannifin Corporation, located in Cleveland, Ohio, which is widely used within the guided motion industry.

Also widely used in the guided motion industry are track assemblies for coupling the track with the support base. FIG. 1 illustrates a known track assembly 125 for coupling the "Vee" edge track 120 to a standard extrusion 130. Previous attempts of providing track assemblies for standard support bases have been complicated, time consuming, difficult to assemble due to the requirement of fasteners, expensive to assemble, and unreliable due to the use of moving parts, among other shortcomings. Indeed, there are many disadvantages to the current state of the art.

Due to the deficiencies of the prior art, there is a need to provide a reliable, effective and easy to assemble track assembly for use with linear motion support bases. Therefore, there is a need to provide a track assembly that effectively couples with a standard support base.

There is also a need to provide methods of manufacturing track assemblies that effectively couple with a standard support base without the use of fasteners. Additionally, there is a need to provide methods of assembling guided motion systems using fastener-less assembly techniques.

Likewise, in applications in which the use of fasteners is preferable, there is a need for uncomplicated, easy-to-assemble, reconfigurable, and universal faster systems.

One drawback of the prior art is that linear guide tracks that utilize fasteners and track assemblies are designed for use with a particular base extrusion. For example, many known linear guide tracks are specifically designed to work with the various T-slot extrusions manufactured by Parker Hannifin Corporation, located in Cleveland, Ohio. However, the specifically designed track assemblies are useless with other extrusion bases or configurations. Therefore, there is a need in the art for a track assembly that is universally useful in any extrusion having a T-slot configuration.

Another drawback to the prior art is that known solutions oftentimes require that the end user cut, drill, or otherwise machine a set of work pieces to initially configure a linear guide system. This is problematic for end users who do not possess a sophisticated machine shop or for those who do not possess the requisite skill to fabricate the required materials.

Furthermore, pre-drilled track is very expensive and requires a user to layout the substrate to which the track is to be assembled in advance. This too is problematic because the user must be especially precise and must have detailed plans well in advance. Moreover, once one particular setup is configured, it cannot be reconfigured without taking apart the entire system and re-drilling.

Another drawback to current linear motion systems is the width profile of a track assembly. For example, known linear motion guides are bulky.

Another significant drawback of the known art is that drilling track and attaching it to a substrate with a plurality of individual fasteners oftentimes results in undulations and imperfections in the linear track. These undulations can negatively affect the entire system.

Likewise, it is difficult to maintain parallelism of the tracks when simply drilling a track down. Oftentimes, parallelism in the tracks is of the utmost importance. For example, a track that even one-one thousandth of an inch off-parallel can negatively affect the performance of an entire linear motion system.

Some other prior art solutions include simply placing a track directly into a T-slot of a base support extrusion. These known solutions oftentimes result in an unacceptably imprecise fit. For example, commercially available base support extrusions will vary in T-slot width for any given mill run. Therefore, a track having a uniform width will either fit too tightly or too loosely within the extrusion's T-slot. Therefore, there is a need to provide a track support extrusion that can reliable accommodate a standard-sized track despite the occasion of small size variances.

SUMMARY OF THE INVENTION

The invention provides novel approaches to manufacturing and assembling linear motion slides that are quick and easy to install. Some embodiments of the invention involve a track assembly apparatus that couples with standard linear motion support bases without the use of fasteners.

The elimination of fasteners results in lower cost, faster assembly, and increased structural integrity due to the elimination of drill holes and tapped holes in the track. According to some embodiments of the present invention, traditional fasteners are replaced with an assembly having deformable teeth protrusions.

Some embodiments of the invention utilize track clamps having a pressure insert portion with teeth protrusions that deform upon coupling with the support base. The deformation of the track clamp teeth ensures a tight fit without the use of fasteners.

Various embodiments of the invention include track assemblies designed to couple tracks to support bases in a variety of configurations including tracks disposed normal to the support base and tracks disposed orthogonal to the support base. In some embodiments of the present invention, the track clamps are designed with shoulder extensions to provide extra support withstand torque on the track.

In some embodiments of the invention, the track clamp apparatus is especially designed to suit any slot in a wide variety of extrusions or barstock material. In the preferred embodiment of the present invention, the track clamp enables the user to integrate the "Vee" edge track manufactured by Bishop-Wisecarver Corporation, located in Pittsburg, Calif., into the T-slots of standard structural extrusion support bases.

Some embodiments of the invention teach low cost methods of installing linear motion tracks into structural extrusion support bases. In some embodiments, the novel track clamp is simply installed using a soft-headed mallet. In some other embodiments, the track is able to be installed by using a cross-head arrangement of rollers to uniformly apply force to insert the track clamp and track into standard structural extrusion support bases.

In some embodiments, the track clamp and track are assembled in a factory. In some other embodiments, the track and track clamp are assembled on-site by an end user.

In some embodiments of the invention, the track clamps are integrated with widely available standard aluminum extrusion support bases such as those manufactured by Parker Hannifin Corporation, located in Cleveland Ohio. In some embodiments of the present invention, the track clamps are especially designed to accommodate various sized "Vee" edge tracks manufactured by Bishop-Wisecarver Corporation, located in Pittsburg, Calif. For example, in some embodiments, the track clamp is designed for tracks sized 0 thru 4, in carbon steel or stainless steel. In some embodiments of the invention, the track and track assembly are chosen to be used with "DualVee"® guide wheels (preferably in steel or stainless steel), manufactured by Bishop-Wisecarver Corporation, located in Pittsburg, Calif.

In some embodiments of the present invention, methods of manufacturing track clamps having deformable teeth extrusions are disclosed.

In some manufacturing applications that require linear track, the use of basic fasteners is preferred to fastener-less couplings. Some embodiments of the invention include a bolt-on clamp track assembly for housing a track and coupling with a support base extrusion. These solutions provide customers with a simple-to-assemble, customizable, reconfigurable, and user-friendly solution for reliable track assembly.

Some other embodiments include a back-to-back track configuration that is coupled to a proprietary base extrusion using clamping washers. These solutions are also user-friendly and convenient, and they also save space.

In yet other embodiments, a custom made extrusion includes deformable fingers in a T-slot for handling track width variance and resisting the removal of the track.

DETAILED DESCRIPTION OF THE INVENTION

Those of ordinary skill in the art will realize that the following detailed description of the present invention is illustrative only and is not intended to limit the claimed invention. Other embodiments of the present invention will readily suggest themselves to such skilled persons having the benefit of this disclosure. It will be appreciated that in the development of any such actual implementation, numerous implementation-specific decisions must be made in order to achieve the developer's specific goals. Reference will now be made in detail to implementations of the present invention as illustrated in the accompanying drawings. The same reference indicators will be used throughout the drawings and the following detailed description to refer to the same or like parts.

Figure 1:
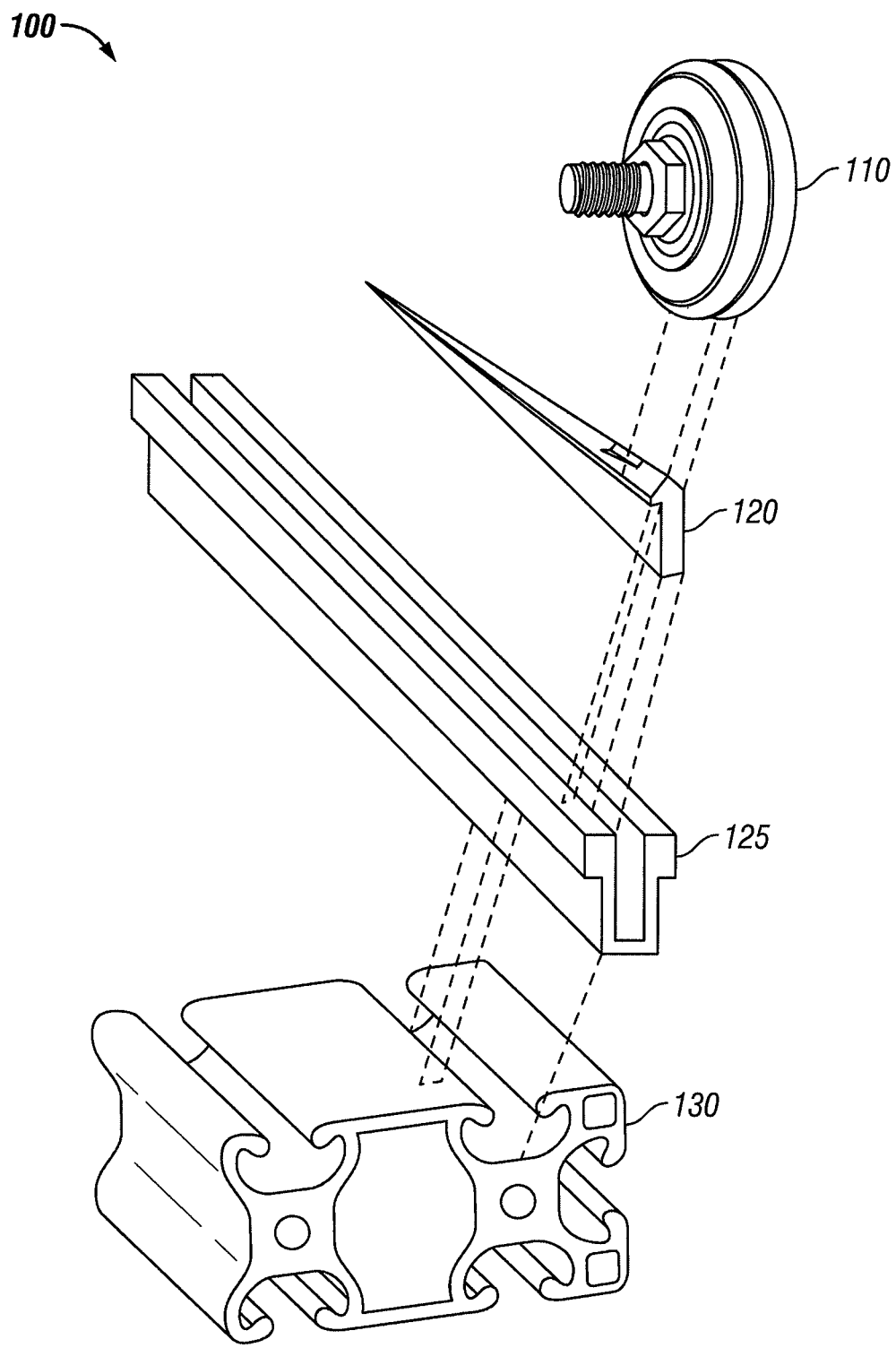
FIG. 1 is an exploded view of a guided motion assembly requiring fasteners previously known in the art.

Linear motion guides are used extensively in manufacturing processes and other applications. The support bases for linear motion guides are typically standard-sized extrusions. For example, FIG. 1 illustrates an isometric schematic representation of a widely available aluminum extrusion support base 130 manufactured by the Parker Hannifin Corporation, located in Cleveland, Ohio. Likewise, tracks and guide wheels for the linear motion guides are typically a standard manufacture and are commercially available. For example, the DualVee® guide wheel and Single Edge Track, both manufactured by Bishop-Wisecarver Corporation, are time-tested and ideal for a wide variety of applications. As discussed above, there is a need for an easy and reliable assembly for coupling a track to a support base.

Figure 2A:
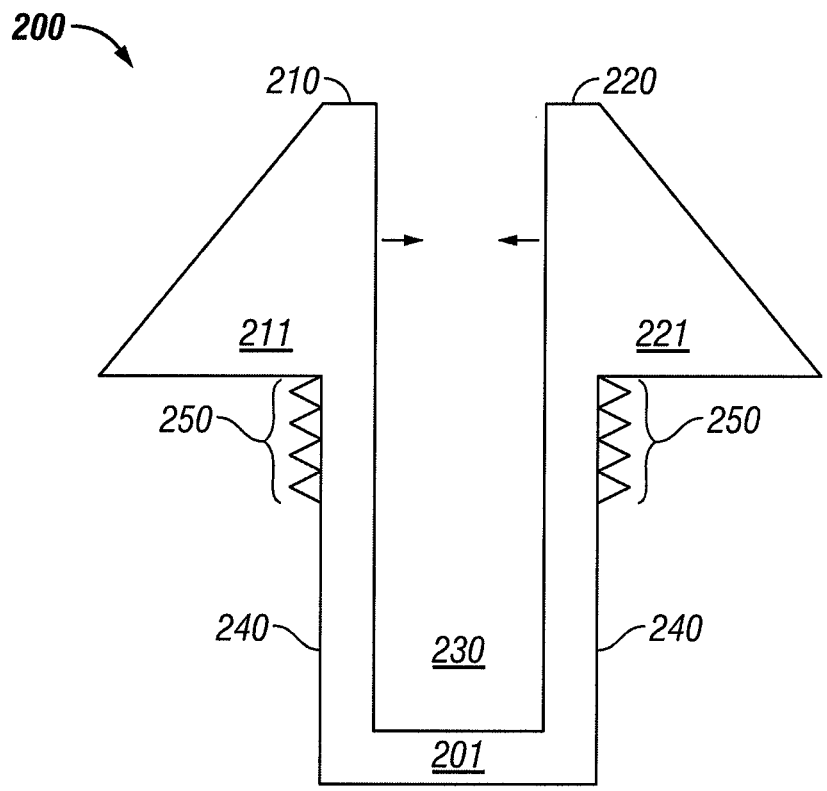
FIG. 2A illustrates an end view of a fastener-less track assembly according to some embodiments of the invention.

FIG. 2A illustrates a schematic end view of the fastener-less track assembly 200 for coupling a linear motion track to a support base according to the present preferred embodiments of the present invention. As shown, the assembly 200 comprises two clamp arms 210, 220 which are connected to a base section 201 to form a well 230. As shown, the two arms 210, 220 extend vertically away from the base section 201 and terminate at a fixed distance from the base section 201, thus defining the well 230.

The well 230 is configured to accommodate a linear motion guide track (not shown). Two shoulders 211, 221 are disposed at the end, and on the outer sides of the arms 210, 220. As described, the assembly 200 is configured to be inserted into a support base (not shown) such that the well is disposed within the support base. Likewise, the support base interacts with the shoulders 211, 221 such that the assembly rests upon the surface of the support base. Additionally, two sets of teeth protrusions 250 are disposed on the outer surfaces 240 of the arms 210, 220. In the present preferred embodiment of the present invention, the teeth protrusions 250 are configured such that they must be deformed to be inserted into a support base, thus provided a fastener-less coupling.

The teeth protrusions 250 are deformed and/or sheared by the press-fitting into an extrusion (not shown). Preferably, the deformation of the teeth protrusions 250 causes the arms 210, 220 to be displaced toward each other (as indicated by the arrows). The displacement clamps a track (not shown) between the arms 210, 220, thereby securing the track therein.

In some embodiments of the invention, the deformation of the teeth protrusions 250 effectuates galling between the track assembly 200 and an extrusion (not shown). In some embodiments of the present invention, the deformation of the teeth protrusions 250 effectuates a cold-pressure solid-state welding process.

Figure 2B:
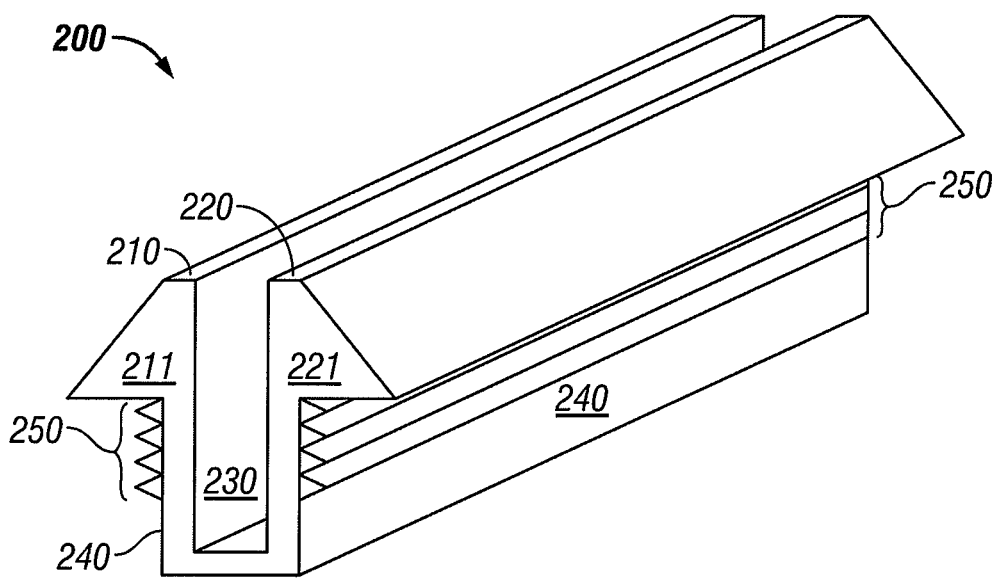
FIG. 2B illustrates an isometric view of a fastener-less track assembly according to some embodiments of the invention.
Figure 2C:
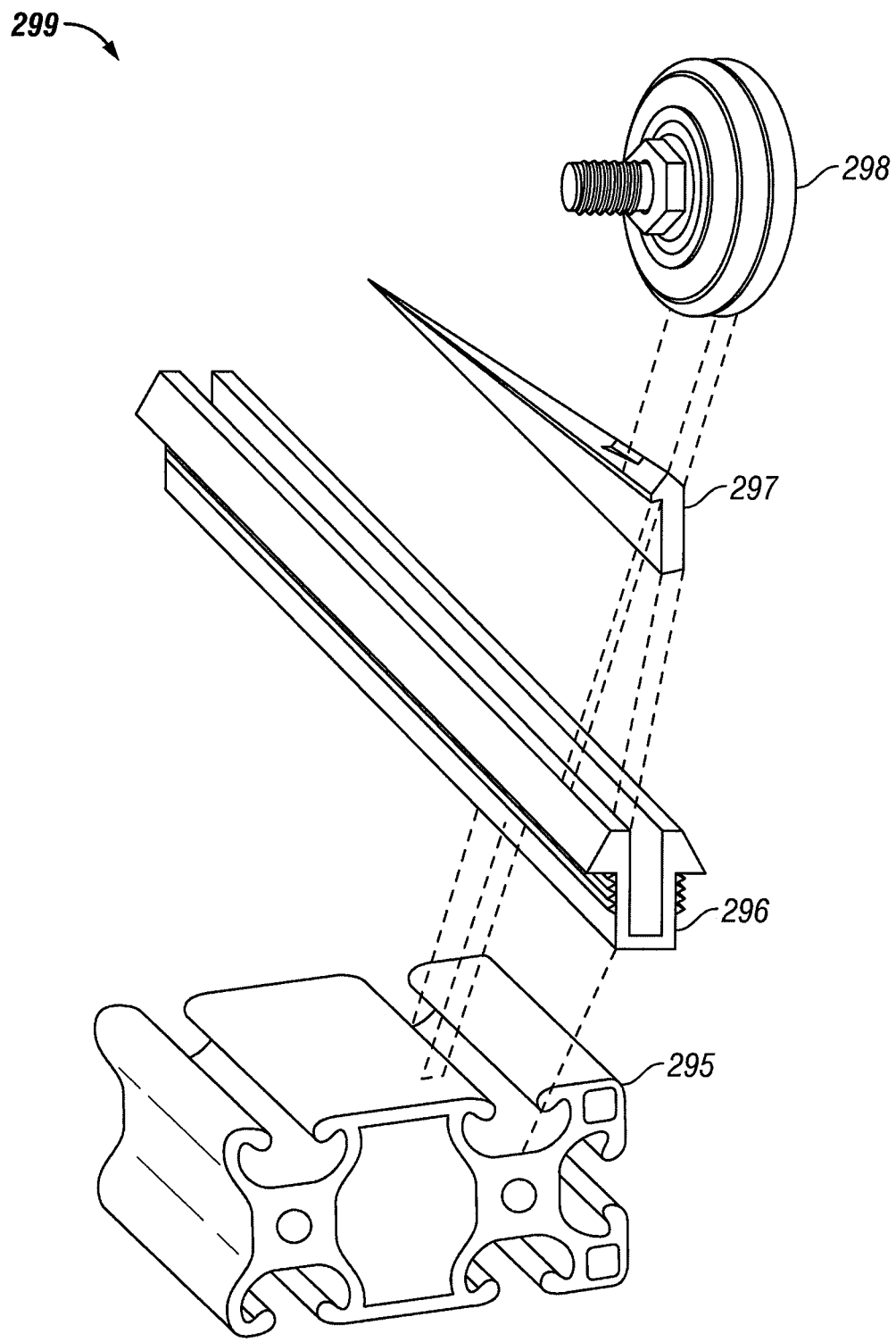
FIG. 2C is an exploded view of a guided motion assembly without requiring fasteners according to some embodiments of the invention.

FIG. 2B illustrates an isometric schematic view of the assembly 200 according to some embodiments of the invention. FIG. 2C illustrates an exploded isometric view of a linear motion apparatus 299 comprising a guide wheel 298, a track 297, a track assembly 296, and a support base extrusion 295.

In some embodiments of the invention, the guide wheel 298 is a DualVee® guide wheel manufactured by Bishop-Wisecarver. Corporation, located in Pittsburg, Calif. According to these embodiments, the guide wheel 298 is chosen from among "Original V Bearing Guide Wheels", "Studded V Bearing Guide Wheels", and "Integral V Bearing Guide Wheels".

The "Original V Bearing Guide Wheels" consist of both an external and internal 90 degree "Vee" angle. The guide wheel is made with a double row angular contact bearing for excellent load capability and long life. V bearing guide wheels are preferably available in 52100 steel or 440C stainless steel from stock. Other options include seals and shields to meet specific application needs. Special DualVee® guide wheels are available for clean room, vacuum, and elevated temperature applications. Customer specific lubricants can also be used with the guide wheels.

The Studded guide wheels combine the versatility and robustness of the DualVee® v bearing guide wheel with convenience of a thru-hole mounting stud into a single piece. Concentric or eccentric stainless steel studs are riveted onto the wheels for a strong connection.

Integral V Bearing Guide Wheels offer a one piece construction. Sizes 2-4 steel wheels feature a one piece bushing or stud shaft with a machined inner bearing race. Sizes 0-1 steel and all polymer wheels utilize a riveted retaining technology to secure the wheel to the stud. Integral wheels add overmolded high performance polymer DualVee® wheels and MadeWell crown rollers to the DualVee® family to provide further component versatility.

In some embodiments of the present invention, the track 297 is a track manufactured by Bishop-Wisecarver Corporation, located in Pittsburg, Calif. These tracks are especially designed for DualVee® guide wheels. In some embodiments, the track 297 is a single edge track, such as the "Vee" edge track, manufactured by Bishop-Wisecarver Corporation, located in Pittsburg, Calif. For example, a single edge track in 1045 carbon steel and 420 stainless steel from stock is available and would benefit from the present disclosure. At the "Vee" edge, a mounting shoulder is provided for quick reference during assembly. The single edge track is able to be disposed with or without hardened "Vee" surfaces. Hardened track comes in lengths of 20 feet, and can be easily butt-jointed for longer length applications. Non-hardened track comes in lengths up to 22 feet, and also may be butt-jointed for longer lengths. Additionally, all single edge track is able to be manufactured with or without drilled holes for mounting. "QuickTrak" series clamp extrusion is also available for fast and easy installation of size 3 DualVee® track.

Figure 3A:
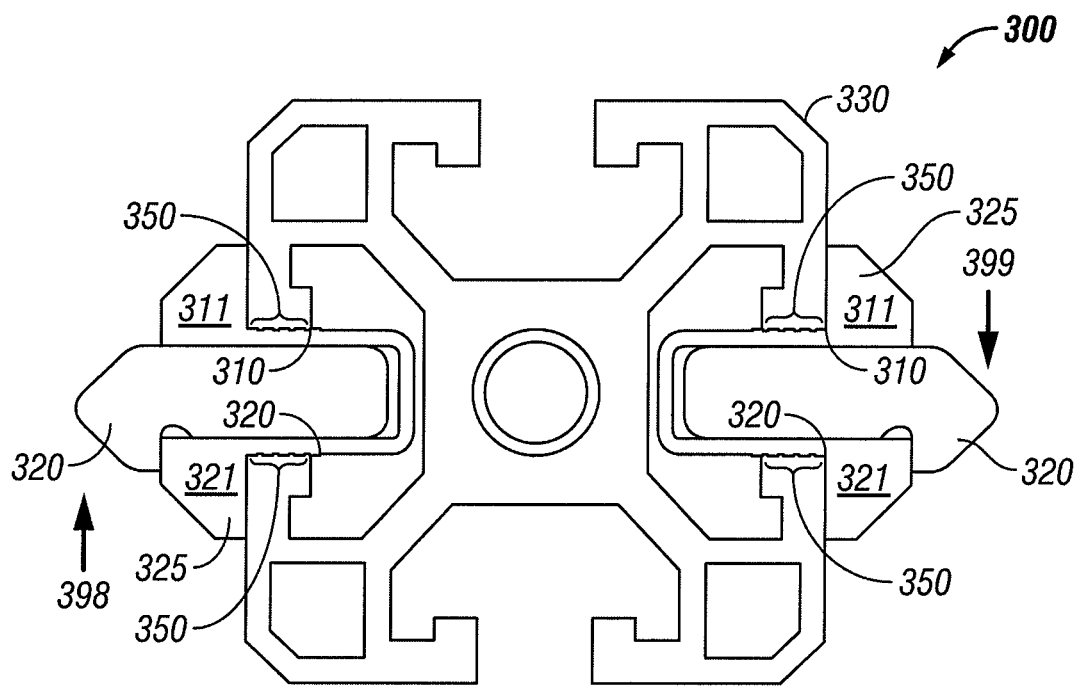
FIG. 3A illustrates an end view of a support base extrusion coupled with a pair of linear motion tracks via fastener-less track assemblies according to some embodiments of the invention.

FIG. 3A illustrates an end view of a linear motion track 300 comprising a support base 330 with a track assembly 325 and track 320. As shown, the track assembly 325 is pressure fitted into the support base 330. In some embodiments of the invention, the track assembly 325 is configured such that it is easily coupled with the support base 330 using only basic tools. In the present preferred embodiment of the present invention, the track assembly 325 is configured such that a simple rubber mallet can easily force the track assembly into the support base 330. However, it will be readily apparent to those having ordinary skill in the art that a wide variety of coupling mechanisms can be used.

The simple and secure coupling ability of the invention provides distinct and extremely useful advantages of the approaches known in the art. For example, since linear motion tracks can be easily assembled without expensive and complicated tools, the cost savings of using the track assembly 325 is great. Additionally, the time to install a linear motion track is greatly reduced through the elimination of complicated assembly. By using a track assembly 325 that is compatible with standard extrusions, businesses do not need to invest in all new support bases and may provide consistency in their plant by using the same parts with the new assemblies. Furthermore, the track assemblies 325 of the invention provide a more secure coupling than other fastenerless approaches.

First, as explained above, teeth protrusions 350 are disposed on the arms 310, 320 of the track assemblies 320. As a result of the pressure fitted coupling, the teeth protrusions 350 are deformed, thus ensuring a secure fit between the track assembly 325 and the support base 330. Additionally, the shoulders 311, 321 provide additional support to the track 320. For example, torque applied to the track 320 (indicated with arrows 398, 399) is resisted by the shoulders 311, 321.

It will be readily apparent to those having ordinary skill in the art that the components disclosed in FIG. 3A, and in other embodiments of the invention may take various sizes, shapes and appearance. In some embodiments, the arms 310, 320 of the track assembly 325 are spaced between 3 mm and 12 mm apart. In some embodiments, the track 320, the base 330 and the track assembly 325 are between 3 m and 6 m long.

In some embodiments, the track assembly 325, as recited, is substantially comprised of steel. In some embodiments, the track assembly 325 as recited is substantially comprised of stainless steel. In some embodiments the track assembly 325 is formed by extrusion. In some embodiments the track assembly 325 is formed by metal injection molding.

In some embodiments of the present invention, the deformation of the teeth protrusions 350 effectuates galling between the track assembly 320 and an extrusion 330. In some embodiments of the present invention, the deformation of the teeth protrusions 350 effectuates a cold-pressure solid-state welding process.

Figure 3B:
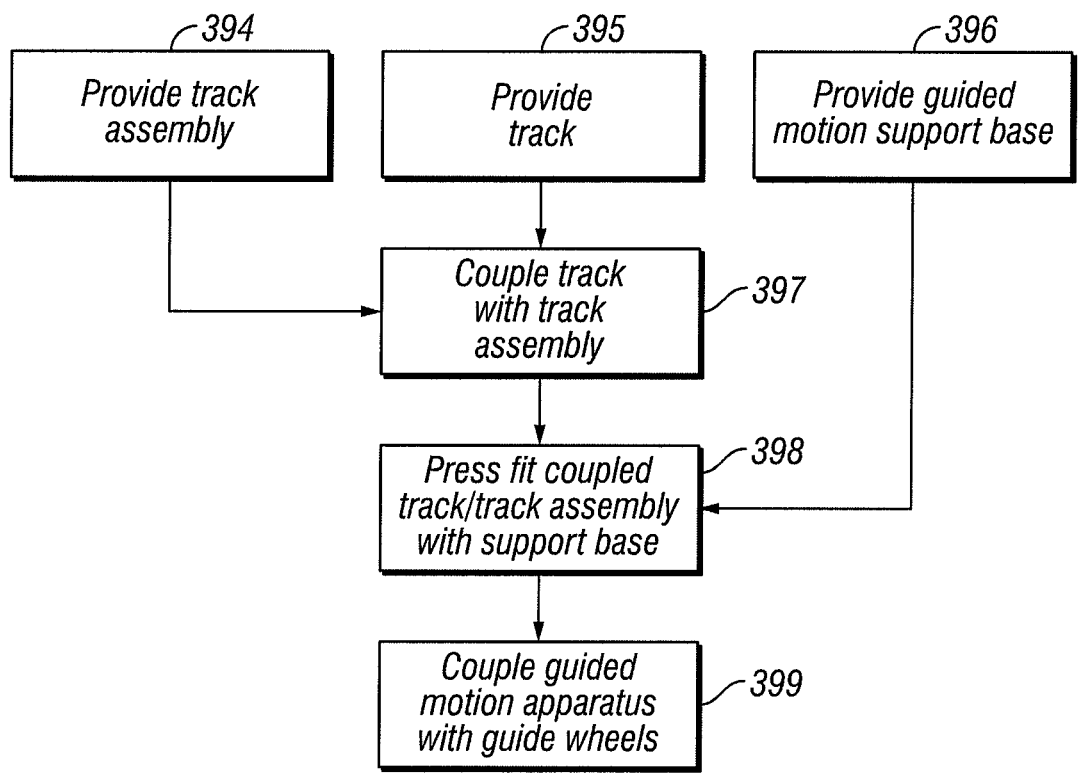
FIG. 3B illustrates process steps for a method of manufacturing a guided motion system according to some embodiments of the invention.

FIG. 3B illustrates methods steps of manufacturing a guided motion system utilizing the novel track assembly of the present invention. The method starts by providing a guided motion support base 396, providing a track 395, and providing a track assembly 394. Preferably, the track and track assembly are substantially axial. Likewise, the guided motion support base preferably has at least one conduit disposed therein for accepting the track assembly. In some embodiments of the invention, the track assembly has cross section that is substantially U-shaped and has a plurality of teeth protrusions disposed on the outside surface of the assembly.

The method of manufacturing shown in FIG. 3B continues with coupling the track with the track assembly 397. Next, the coupled track/track assembly is press-fitted into the conduit of the support base 398. As explained above, a rubber mallet may easily tap the track/track assembly into the support base. According to some embodiments, the teeth protrusions on the track assembly are deformed when the track assembly is press-fitted in the support base, thus providing a secure coupling. Finally, the assembled guided motion assembly is slidably coupled with one or more guide wheels 399.

In some embodiments of the invention, the method further comprises manufacturing the track, the support base, and/or the track assembly. In some embodiments, the components are formed via an extrusion. In other embodiments, the components are formed by metal injection molding.

Figure 4:
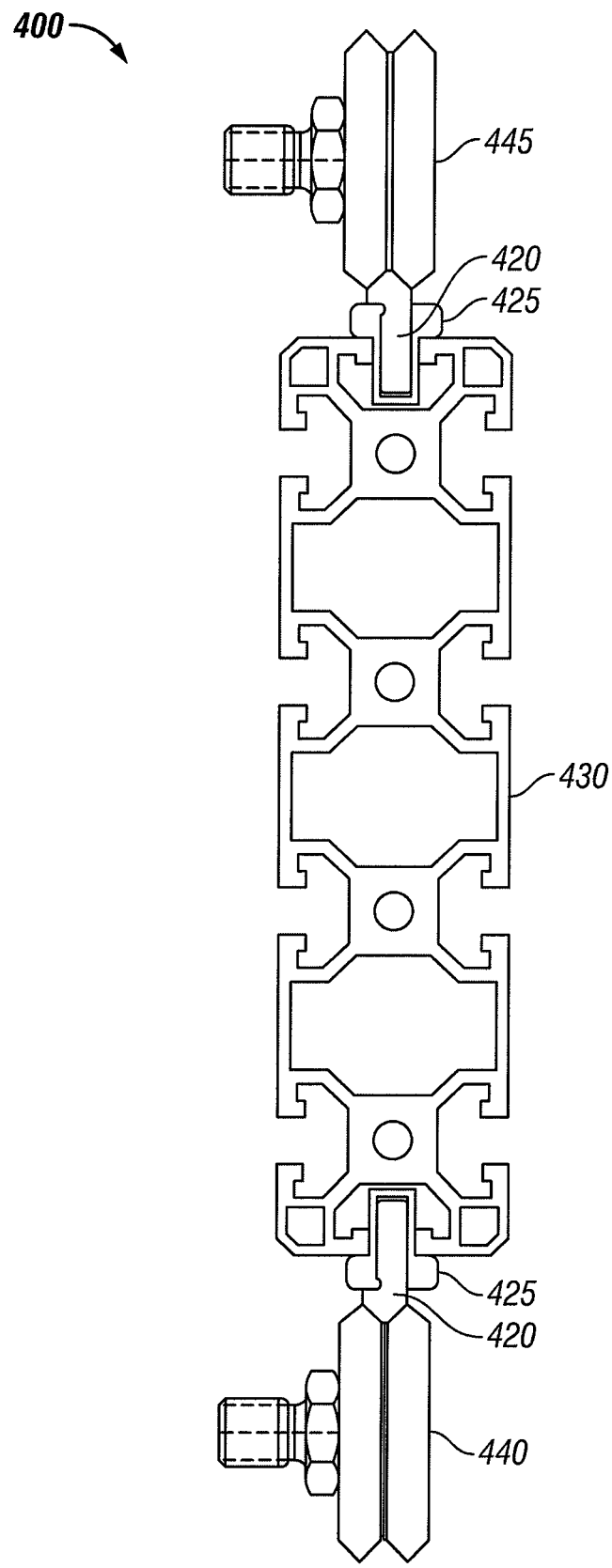
FIG. 4 illustrates a side view of an alternative support base extrusion coupled with a pair of linear motion tracks via fastener-less track assemblies according to some embodiments of the invention.
Figure 5:
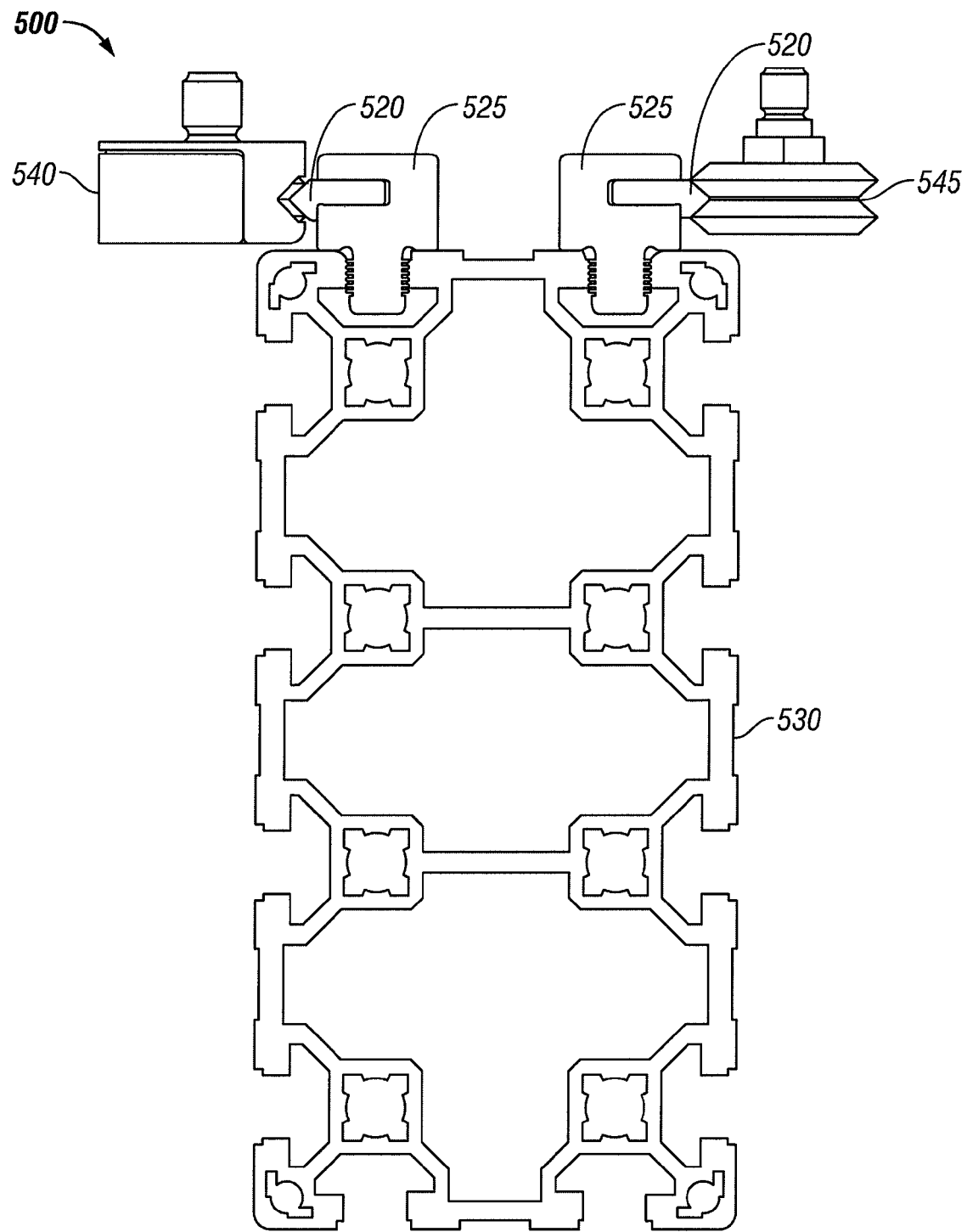
FIG. 5 illustrates a side view of an alternative support base extrusion coupled with a pair of linear motion tracks via fastener-less track assemblies according to some embodiments of the invention.
Figure 6:
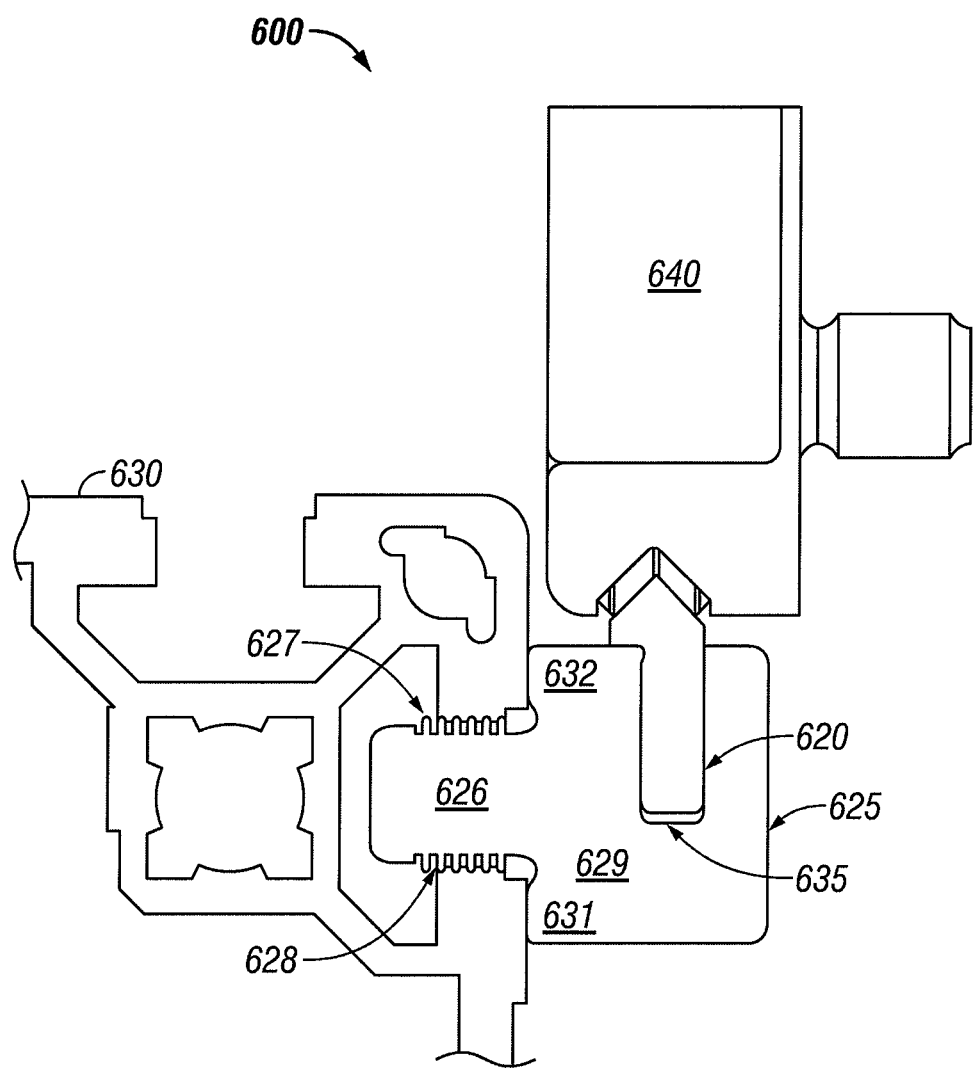
FIG. 6 illustrates a side view of an alternative support base extrusion coupled with a linear motion tracks via fastener-less track assemblies according to some embodiments of the invention.

FIG. 3A illustrates a support base 330 with two track assemblies 325 and two tracks 320. However, it will be readily apparent to those having ordinary skill in the art, having the benefit of this disclosure that a number of assembly configurations will benefit from the invention. FIGS. 4-6 illustrate schematic views of alternate embodiments of linear motion tracks utilizing novel track assemblies according to various embodiments of the present invention.

FIG. 4 illustrates an end schematic view of a linear motion apparatus 400 comprising a support base 430 disposed vertically between two guide wheels 440, 445. The support base 430 is coupled to tracks 420 via assembly 425. A plurality of teeth protrusions (not shown) are disposed on the assembly 425. As shown, the apparatus 400 is configured to move in and out of the page.

In some embodiments of the invention, the deformation of the teeth protrusions (not shown) effectuates galling between the track assembly 425 and an extrusion 430. In some embodiments of the present invention, the deformation of the teeth protrusions (not shown) effectuates a cold-pressure solid-state welding process.

FIG. 5 illustrates an end schematic view of a linear motion apparatus 500 comprising a support base 530 disposed vertically between two guide wheels 540, 545. The support base 530 is coupled to tracks 520 via assembly 525. A plurality of teeth protrusions (not labeled) are disposed on the assembly 525. As shown, the apparatus 500 is configured to move in and out of the page.

In some embodiments of the invention, the deformation of the teeth protrusions (not shown) effectuates galling between the track assembly 525 and an extrusion 530. In some embodiments of the present invention, the deformation of the teeth protrusions (not labeled) effectuates a cold-pressure solid-state welding process.

FIG. 6 illustrates an end schematic view of a linear motion apparatus 600 comprising a support base 630 disposed vertically between two guide wheels 640, 645. The support base 630 is coupled to tracks 620 via track assembly 625. A plurality of teeth protrusions 627, 628 are disposed on the assembly 625. As shown, the apparatus 600 is configured to move in and out of the page.

In some embodiments of the invention, the deformation of the teeth protrusions 627, 628 effectuates galling between the track assembly 625 and an extrusion 630. In some embodiments of the present invention, the deformation of the teeth protrusions 627, 628 effectuates a cold-pressure solid-state welding process.

The track assembly 625 is substantially axial, in and out of page, and includes a substantially axial plug section 626 with a plurality of teeth protrusions 627, 628 disposed on the outer side of the plug section 626. Additionally, the plug section 626 includes a substantially axial cap section 629 coupled to the plug section 626 wherein the cap section 629 is at least partially wider than the plug section, forming shoulders 631, 632 which rest upon the surface of the support base 630 when the track assembly 625 is coupled with the base section 630. Furthermore, a well 635 is disposed in the cap section 629 configured to hold the track 620 therein. According to some embodiments of the present invention, and as shown in FIG. 6, the orientation of the well 635 within the cap section 629 is substantially orthogonal to the orientation of the plug section 626. In some embodiments of the invention, the cap section 629 and the plug section 626 are integral.

As explained above, there is an existing need in the art for an apparatus and system for providing customers with a simple-to-assemble, customizable, reconfigurable, and user-friendly solution for reliable track assembly. To meet this need, some other embodiments of the invention involve simple fastening of a track to a support base using standard commercially-available hardware and a novel bolt-on clamp extrusion. The bolt-on clamp extrusion also allows effortless parallel alignment of the track using a raised-up guide ridge that accommodates variously-sized support base extrusions. Other advantages of these embodiments of the invention will be readily apparent to those with ordinary skill in the art having benefit of this disclosure.

Figures 7A, 7B:
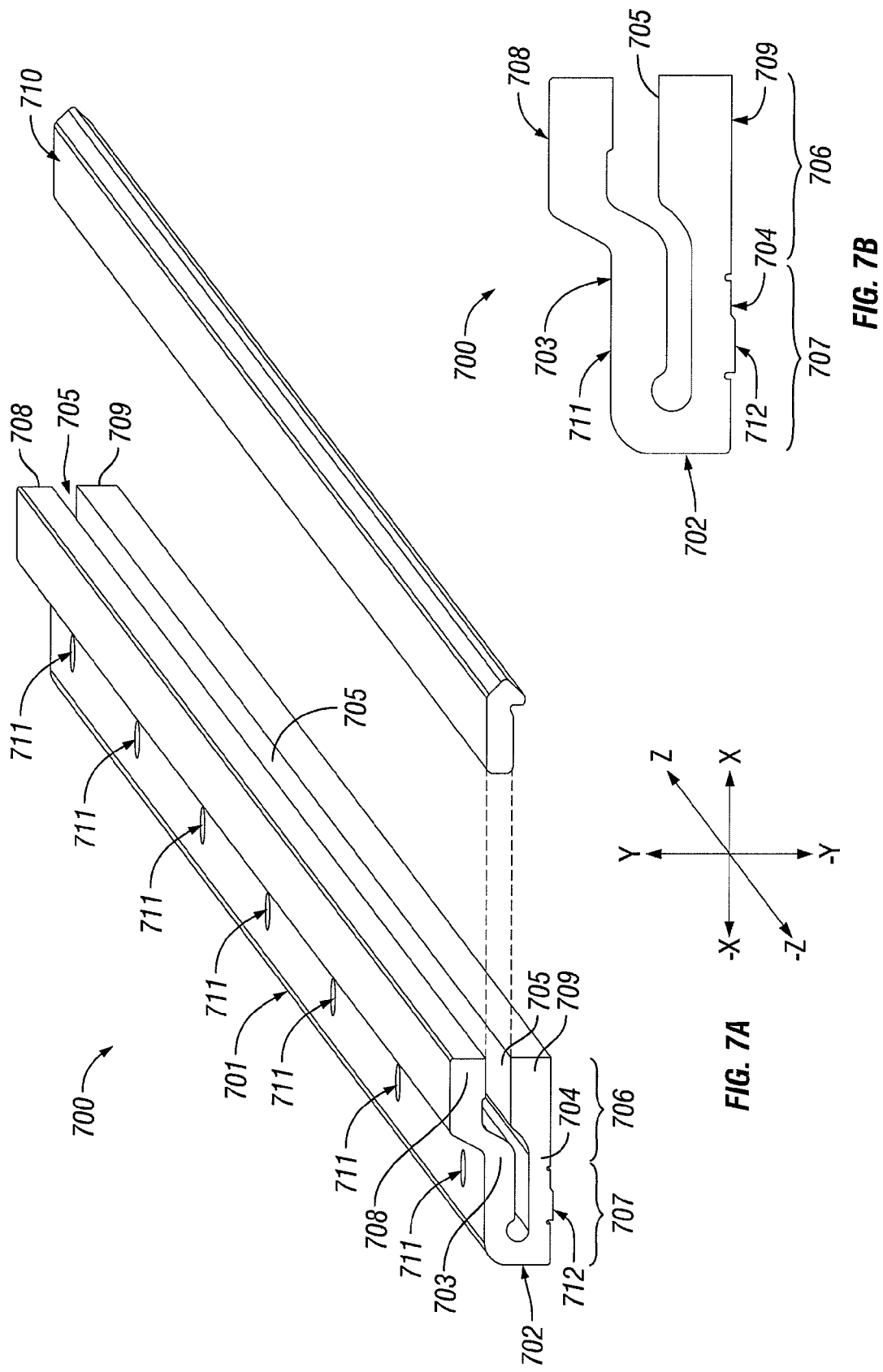
FIG. 7A is a schematic isometric representation of the bolt-on clamp extrusion and a track according to some embodiments of the invention.
FIG. 7B is an end view of the bolt-on clamp extrusion according to some embodiments of the invention.

FIG. 7A is a schematic isometric representation of the bolt-on clamp extrusion 700 and a track 710 according to some embodiments of the invention. The bolt-on clamp extrusion 700 comprises an elongated, integral axial member 701 having a connected end 702 and two arms 703, 704 disposed in parallel planes. The two arms 703, 704 terminate with two clamping fingers 708, 709 in a finger-clamping region 706 at the end opposite the connected end 702.

FIG. 7B is an end view of the bolt-on clamp extrusion 700 according to some embodiments of the invention.

Referring again to FIG. 7A, the two horizontally disposed arms 703, 704 define a gap 705 running axially throughout the length of the bolt-on clamp extrusion 700. The gap 705 is configured to accept the insertion of a track 710. In the presently preferred embodiments of the invention, the track 710 comprises a DualVee® track manufactured by Bishop-Wisecarver Corporation, located in Pittsburg, Calif. The gap 705 extends in the −x-direction past the finger-clamping region 706 into a bolt-down region 707.

The bolt-down region 707 of the arms 703, 704 includes a plurality of pre-drilled conduits 711, each of which line up in the y-direction as they pass through each of the arms 703, 704. The pre-drilled conduits 711 are configured for accommodating a bolt (not shown) such that at least a portion of the bolt extends completely through each conduit 711 for coupling with a nut (not shown). The bolt-down region 707 also includes a raised-area groove 712 extending axially on the underside length of the bolt-on clamp extrusion 700. The raised-area groove 712 is configured to self-align with a slot of a support base extrusion (not shown) such that a track (not shown) inserted in to the bolt-on clamp extrusion 700 remains parallel to the support base extrusion.

Maintaining parallelism between the track and the support base extrusion is extremely important. However, as explained above, previous solutions require careful measuring, alignment, and drilling. Accordingly, self-alignment between the raised-area groove 712 and a slot of the support base extrusion provides a simple way to align the two work pieces parallel when assembling a track system. This user-friendliness itself provides a novel advantage of the approaches known in the art.

In some embodiments of the invention, the raised-area groove 712 is less wide than the total width of the slot of the support base extrusion, such that the raised-area groove 712 can align with either side of the slot.

Moreover, the advantages gained by providing simple parallel alignment are compounded synergistically with the advantages of simplicity of assembly gained by providing coupling and clamping mechanisms using fasteners.

For example, a user of the bolt-on clamp extrusions 700 does not need a sophisticated machining shop to assemble a linear guide system. As explained above, known solutions oftentimes require that the end user cut, drill, or otherwise machine work pieces to configure a linear guide system. However, bolt-on clamp extrusions require only commercially available parts and are easily assembled and reconfigured without requiring any skill.

Figure 7C:
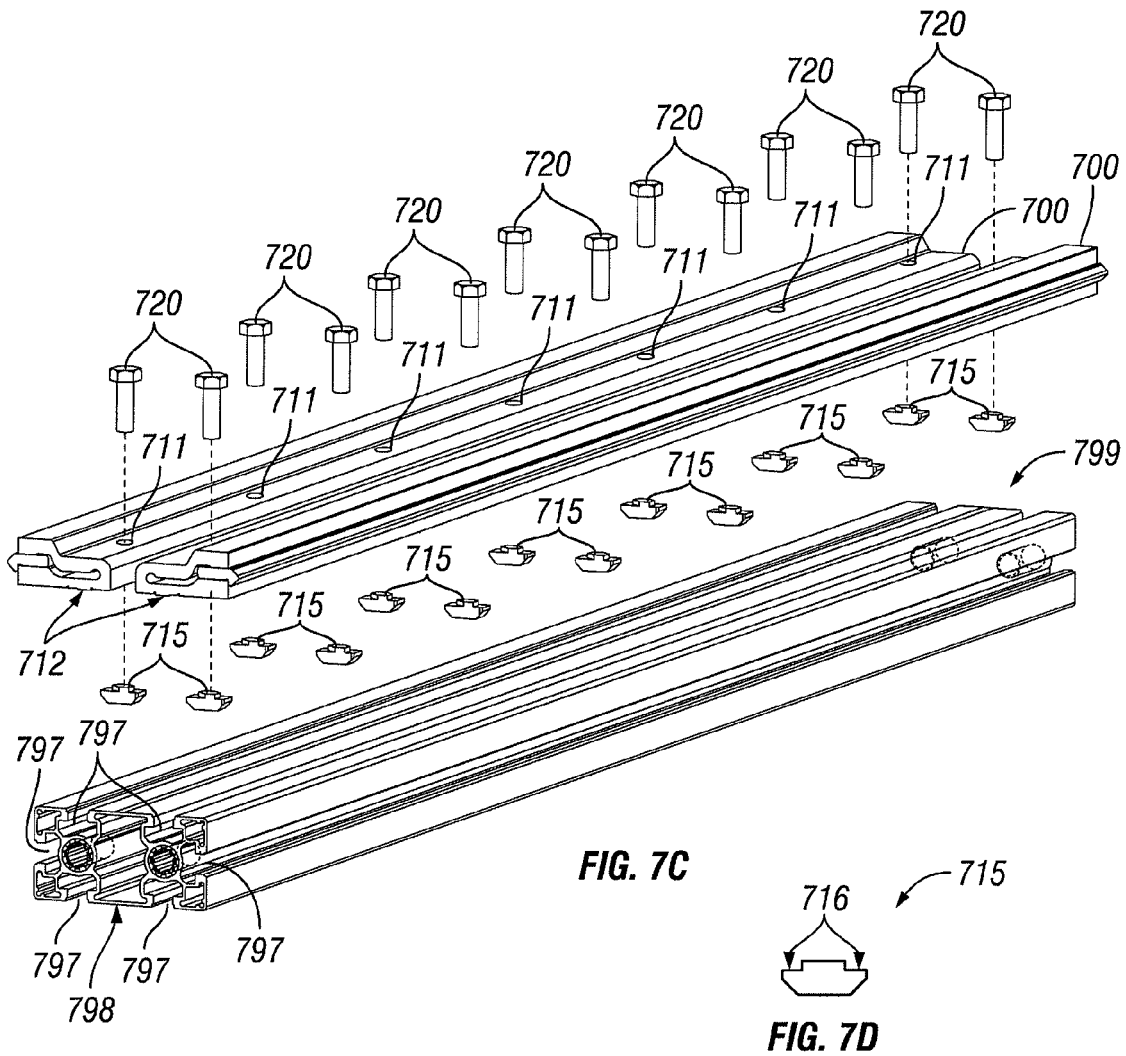
FIG. 7C is an exploded view of a support base extrusion and two bolt-on clamp extrusions according to some embodiments of the invention.

FIG. 7C is an exploded view of a support base extrusion 799 and two bolt-on clamp extrusions 700 according to some embodiments of the invention. The support base extrusion 799 comprises an integral member 798 extending axially in the z-direction. The support base extrusion 799 comprises a plurality of t-slots 797 disposed along the length of the support base extrusion 799.

The pre-drilled conduits 711 of the bolt-on clamp extrusions 700 align with t-slots 797 of the support base extrusion 799 and a plurality of nuts 715 and bolts 720 couple the bolt-on clamp extrusions 700 with the support base extrusion 799. The plurality of nuts 715 are inserted into the t-slots 797 of the support base extrusion 799.

Figure 7D:
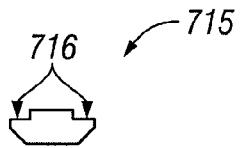
FIG. 7D is a schematic representation of a nut used in a bolt-down clamp assembly according to some embodiments of the invention.

FIG. 7D is a schematic representation of a nut 715 according to some embodiments of the invention. The nuts 715 include arms 716 which contact the inner-surface of the t-slot 797 upon an upward application of force on the nut 715 and therefore resist said force. In the presently preferred embodiments of the invention, the nuts 715 and bolts 720 are commercially available.

The plurality of blots 720 are inserted through the pre-drilled conduits 711 and extend into the t-slots 797 where they couple with the plurality of nuts 715. In the presently preferred embodiments of the invention, the nuts 715 and bolts 720 are threaded such that providing torque to the bolts 720 about the y-axis couples the bolts 720 with the nuts 715. The process of coupling the bolts 720 with the nuts 715 results in an upward force on the nuts 715. This force is resisted by the t-slots 797, thereby securing the bolt-on clamp extrusions 700 with the support base extrusion 799.

Figure 7E:
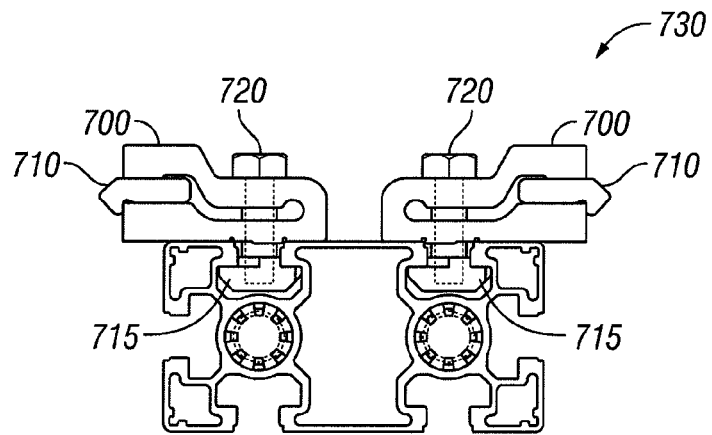
FIG. 7E is an end-view of an assembled track system with bolt-on clamp extrusions coupled with support base extrusions according to some embodiments of the invention.

The process of coupling the nuts 715 and bolts 720 also deforms the arm 703 and the finger 708, thereby clamping the finger-clamping region 706 onto the track 710 inserted therein. FIG. 7E is an end-view of an assembled track system 730 with bolt-on clamp extrusions 700 coupled with support base extrusions 799 with nuts 715 and bolts 720, thereby clamping the bolt-on clamp extrusions 700 onto tracks 710.

Figure 7F:
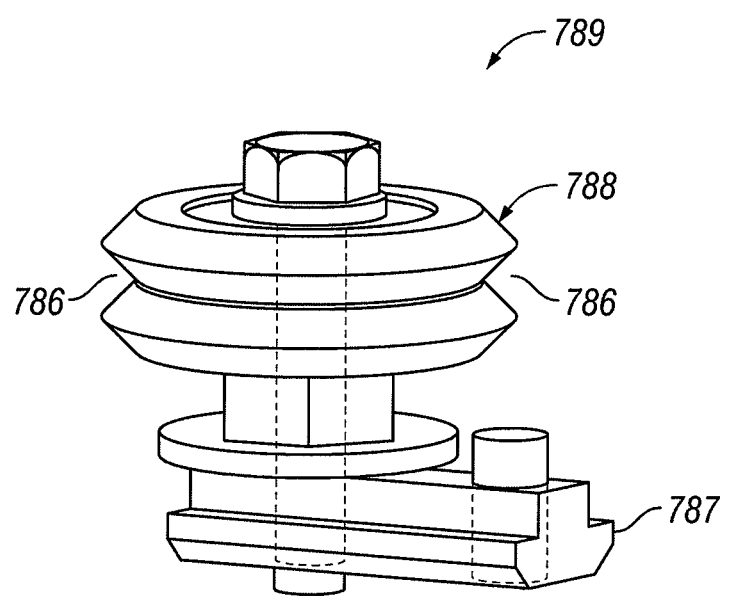
FIG. 7F illustrates a representation of a guide wheel assembly that is configured to be used with a track system according to some embodiments of the invention.

The assembled track system 730 is preferably used with one or more DualVee® guide wheels manufactured by Bishop-Wisecarver Corporation, located in Pittsburg, Calif. FIG. 7F illustrates a representation of a guide wheel assembly 789 that is configured to be used with a track system 730 according to some embodiments of the invention. The guide wheel assembly 789 comprises a DualVee® guide wheel 788 coupled with a T-bar 787. The T-bar 787 is configured to slidably couple with a T-slot of standard slidable beam extrusions. The DualVee® guide wheel 788 includes a v-shaped valley 786 for accommodating a track 710 of the track system 730.

Figure 7G:
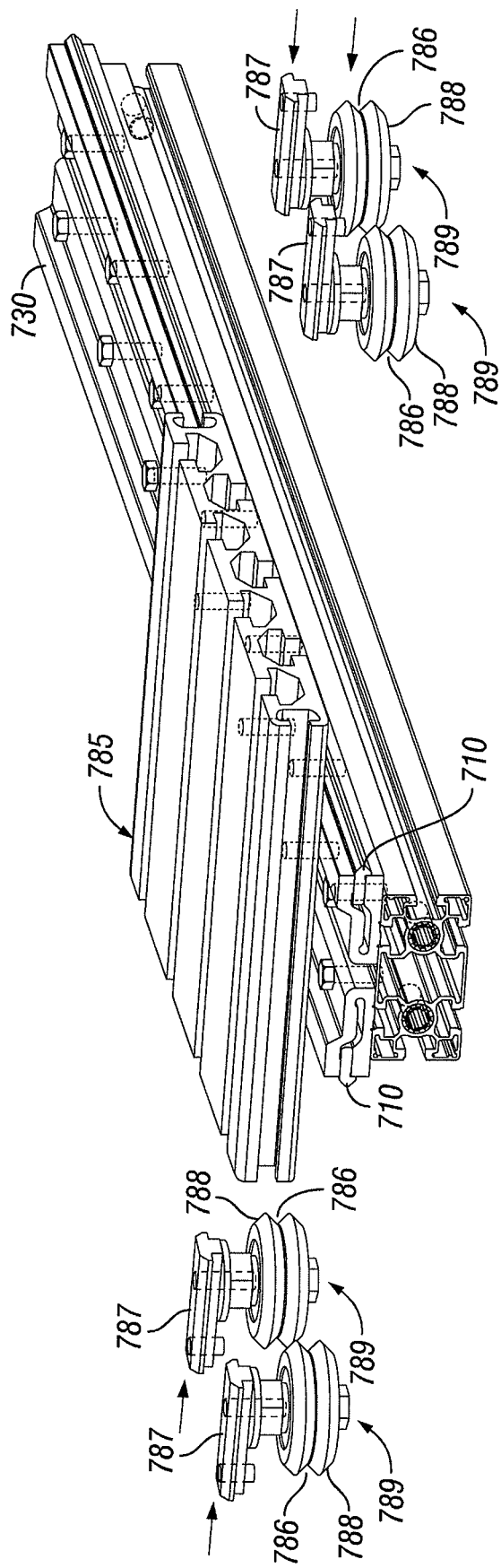
FIG. 7G is an exploded view of an assembled track system capable of being coupled with a slidable beam extrusion via a plurality of guide wheel assemblies according to some embodiments of the invention.

FIG. 7G is an exploded view of an assembled track system 730 capable of being coupled with a slidable beam extrusion 785 via a plurality of guide wheel assemblies 789. The track bars 787 of the guide wheel assemblies 789 slide into a T-slot (not labeled) of the slidable beam extrusion 785 until the track 710 is housed in the v-shaped valley 786 of the DualVee® guide wheel 788. In some embodiments of the invention, a felt wiper may be coupled to slidable beam extrusion 785. In yet other embodiments, a brake mechanism can be included in the system.

The bolt-on clamp extrusion track assemblies 730 provide users with a simple-to-assemble, customizable, reconfigurable, and user-friendly solution for reliable track assembly. Moreover, the tracks are readily replaceable to accommodate tracks made of other material and to service a track that may need to be straightened or otherwise serviced. Other advantages will be apparent to those with ordinary skill in the art having the benefit of this disclosure.

FIG. 8A through 8D illustrate some other embodiments of the invention which include a back-to-back track assembly 800. As explained above, there is a need for simply-assembled, user-friendly, reconfigurable, low-profile track assemblies. The back-to-back track assembly 800 fulfills these needs as explained herein.

Figure 8A:
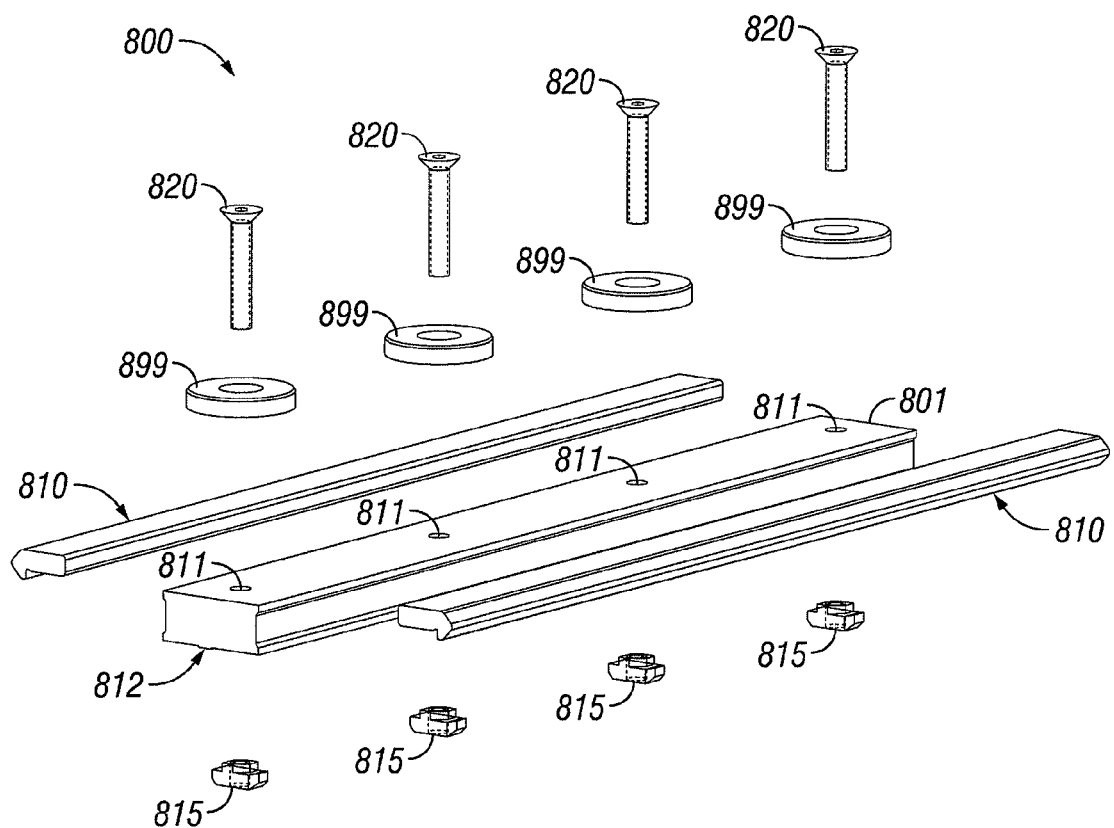
FIG. 8A is an exploded view of a back-to-back track assembly according to some embodiments of the invention.

FIG. 8A is an exploded view of a back-to-back track assembly 800 according to some embodiments of the invention. The back-to-back track assembly 800 includes a base extrusion 801 that includes a raised-area groove 812 configured to self-align with a slot of a support base extrusion (not shown), as explained above. The base extrusion 801 also includes a plurality of pre-drilled conduits 811, each of which line up in the y-direction as they pass through the base extrusion 801. The pre-drilled conduits 811 are configured for accommodating a plurality of bolts 820 such that at least a portion of the bolts 820 extend completely through the base extrusion 801 for coupling with one of a plurality of nuts 815.

Figure 8B:
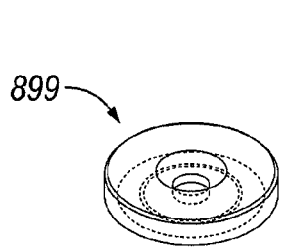
FIG. 8B is an isometric representation of a retaining washer according to some embodiments of the invention.
Figure 8C:
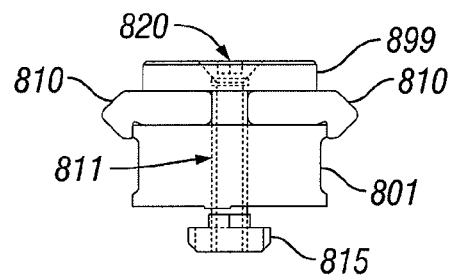
FIG. 8C illustrates an end view of a coupled back-to-back track assembly according to some embodiments of the invention.

The back-to-back track assembly 800 also includes two tracks 810 that lay on the base extrusion 801 and are coupled to the base extrusion 801 via a plurality of retaining washers 899. FIG. 8C illustrates an end view of a coupled back-to-back track assembly 800. As shown in FIG. 8C, the retaining washers 899 couple the tracks 810 to the base extrusion 801 by sandwiching the tracks 810 between the retaining washer 899 and the base extrusion 801 and securing the coupling by screwing the bolt 820 into the nut 815. In the preferred embodiments of the invention, the retaining washers 899 are countersunk, as shown in FIG. 8B.

Figure 8D:
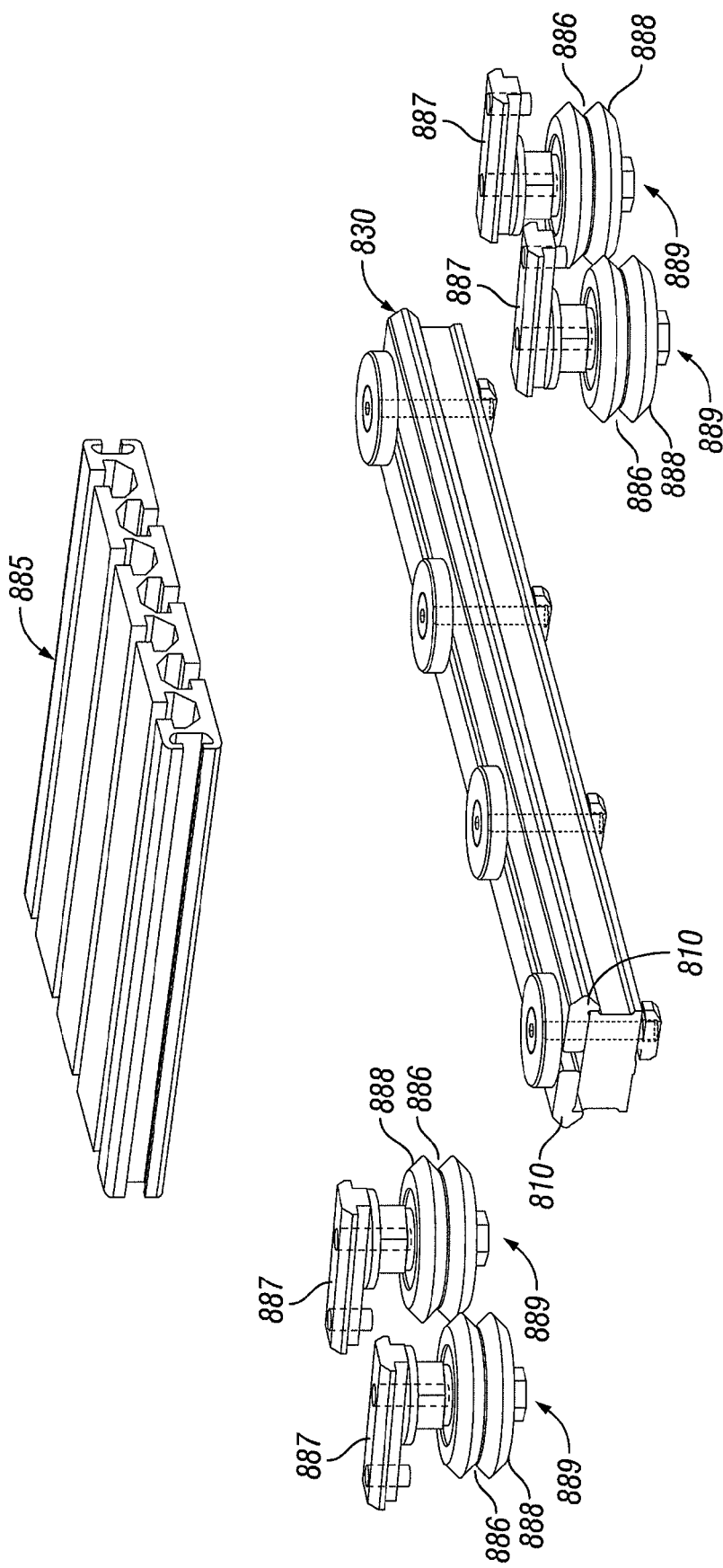
FIG. 8D is an exploded view of an assembled track system capable of being coupled with a slidable beam extrusion via a plurality of guide wheel assemblies according to some embodiments of the invention.

FIG. 8D is an exploded view of an assembled track system 830 capable of being coupled with a slidable beam extrusion 885 via a plurality of guide wheel assemblies 889. The track bars 887 of the guide wheel assemblies 889 slide into a T-slot (not labeled) of the slidable beam extrusion 885 until the track 810 is housed in the v-shaped valley 886 of the DualVee® guide wheel 888. In some embodiments of the invention, a felt lubrication wiper may be coupled to slidable beam extrusion 885. In yet other embodiments, a brake mechanism can be included in the system.

The back-to-back track assemblies also provide users with a simple-to-assemble, customizable, reconfigurable, and user-friendly solution for reliable track assembly. Moreover, the tracks are readily replaceable to accommodate tracks made of other material and to service a track that may need to be straightened or otherwise serviced. Other advantages will be apparent to those with ordinary skill in the art having the benefit of this disclosure.

Figure 9A:
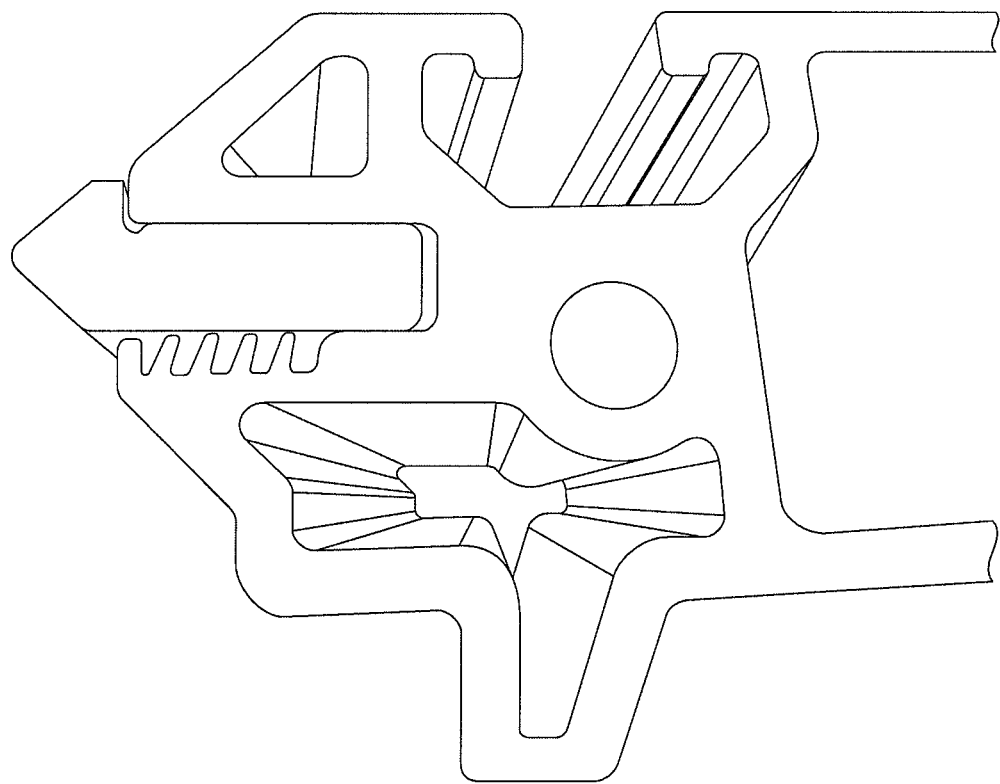
FIG. 9A is an example of a support base extrusion with a plurality of deformable fingers disposed in the slot with a track inserted therein according to some embodiments of the invention.
Figure 9B:
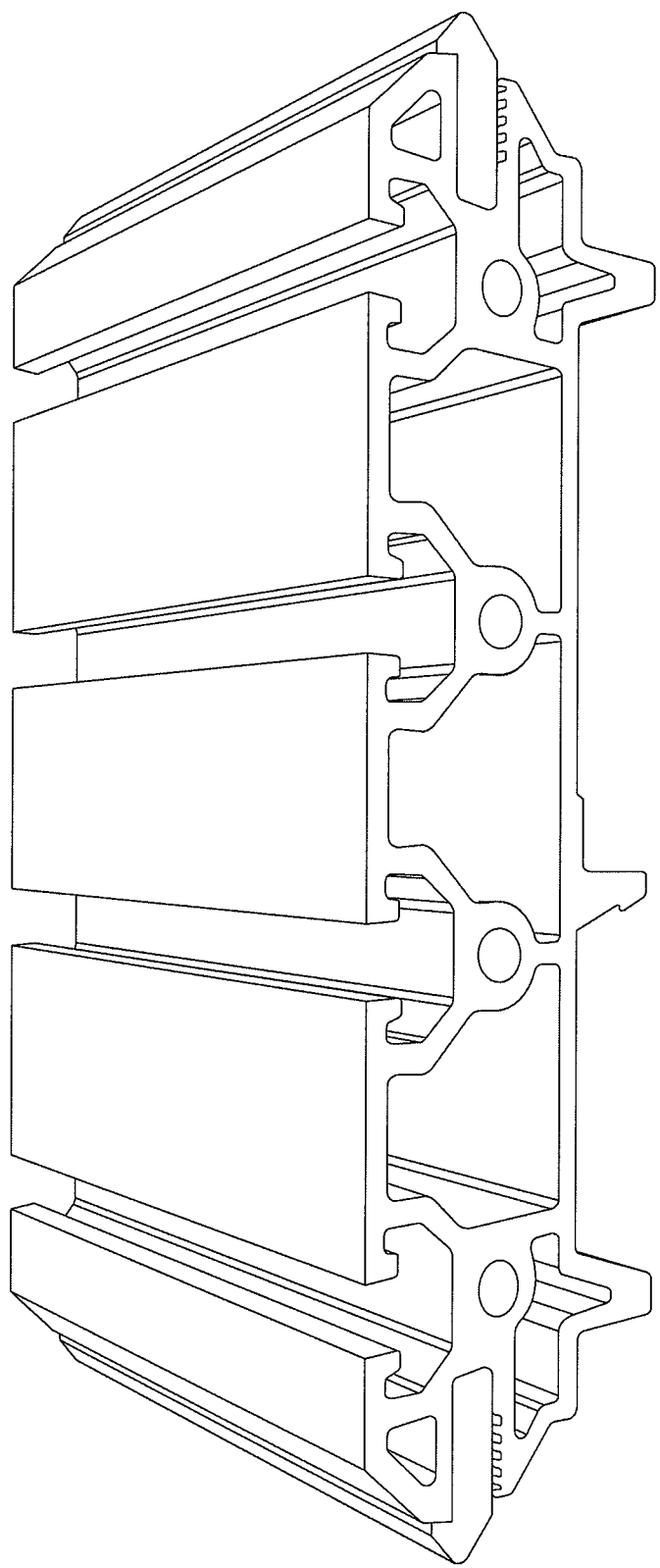
FIG. 9B is an alternate example of a support base extrusion with a plurality of deformable fingers disposed in the slot with a track inserted therein according to some other embodiments of the invention.

Some other embodiments of the invention include a custom-made, snap-in support base extrusion for holding a track without the use of an assembly or without using fasteners. FIGS. 9A and 9B illustrate some other embodiments of the invention which include a snap-in support base extrusion 999.

As explained above, some other prior art solutions include simply placing a track directly into a T-slot of a base support extrusion. These known solutions results in an unacceptably imprecise fit. For example, commercially available base support extrusions will vary in T-slot width for any given mill run. Therefore, a track having a uniform width will either fit to tightly or too loosely within the slot. A solution to this problem is addressed by creating a plurality of deformable fingers in a track slot that elastically and/or plastically deform when a track is inserted into the slot, thereby resisting the removal of the track and ensuring a tight fit despite variations in track or slot size.

FIG. 9A is an example of a support base extrusion with a plurality of deformable fingers disposed in the slot with a track inserted therein according to some embodiments of the invention. FIG. 9B is an alternate example of a support base extrusion with a plurality of deformable fingers disposed in the slot with a track inserted therein according to some other embodiments of the invention.

The invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device and method of the invention could be implemented in several different ways and have several different appearances.

The invention claimed is:

1. A system, comprising:
a linear motion guide track comprising an axial member;
a support base extrusion comprising at least one T-shaped slot disposed therein that extends inward from an opening in an outer surface of the support base extrusion to define a core, wherein the opening is more narrow than the core;
an elongated integral clamp member that comprises
a lower surface, an upper surface opposite the lower surface, a first end, and a second end opposite the first end,
a connected end that is located at the first end and extends from the lower surface to the upper surface,
a first arm that extends from the connected end to the second end, wherein the first arm defines a bolt down region of the lower surface that extends from the first end, and a corresponding clamping region that extends from the bolt down region to the second end, and
a second arm that extends from the connected end to the second end, wherein the second arm defines the upper surface that extends from the first end to a corresponding clamping region at the second end,
wherein a gap is defined between the first arm and the second arm, wherein the gap extends from the second end to the connected end, and wherein the gap is configured to accept the linear motion guide track,
wherein the first arm and the second arm are disposed in substantially parallel planes within the corresponding clamping region,
wherein each of the arms further comprise a plurality of corresponding conduits that extend from the upper surface to the lower surface, wherein the plurality of corresponding conduits are normal to the lower surface and to the parallel planes, wherein the plurality of conduits line up relative to each of the arms through the gap, and wherein the plurality of conduits are located along the length of the elongated integral clamp member; and
a plurality of bolts inserted through at least two of the plurality of conduits, some of the corresponding conduits such that each of the bolts extend through the gap and are threaded into corresponding ones of the plurality of nuts, wherein threading of the at least two bolts to the corresponding nuts results in a clamping force that is resisted by the nuts, thereby securing the bolt down surface of the elongated clamp member against the outer surface of the support base extrusion, and causing the gap to narrow, thereby causing the elongated integral clamp member to clamp onto the linear motion guide track.

2. The system of claim 1, wherein a cross section of the linear motion guide track has a coupling end comprising a substantially rectangular shape and an effective end opposite the coupling end, wherein the effective end comprises a substantially triangular shape for coupling with a guide wheel having a substantially v-shaped interface, wherein the linear motion guide track is configured to geometrically mate with the guide wheel.

3. The system of claim 1, wherein the elongated integral clamp member further comprises a raised area groove that extends from the bolt down region of the lower surface, wherein the raised area groove is alignable with either side of the either side of the T-shaped slot to ensure parallelism between the elongated integral clamp member and the support base extrusion.

4. The system of claim 1, further comprising:
a beam extrusion having at least one T-shaped slot disposed therein that extends inward from an opening in the beam extrusion to define a core, wherein the opening is more narrow than the core; and
at least one guide wheel assembly, wherein each of the at least one guide wheel assemblies comprise
a track bar that is slidably inserted with the T-shaped slot of the beam extrusion, and
a guide wheel that is rotatably coupled to the track bar;
wherein the guide wheel is configured to geometrically couple with the linear motion guide track;
wherein the beam extrusion is linearly movable over the axial distance of the linear motion guide track.

5. The system of claim 4, further comprising a braking mechanism coupled to the beam extrusion, wherein the braking mechanism is configured to resist the linear motion of the beam extrusion on the linear motion guide track.

6. The system of claim 1, wherein the first arm and the second arm of the elongated integral clamp member terminate with corresponding clamping fingers at the second end.

7. The system of claim 1, wherein the elongated integral clamp member is formed by extrusion.

8. The system of claim 1, wherein the elongated integral clamp member is formed by metal injection molding.

9. A method, comprising the steps of:
providing a support base extrusion having an outer surface, and at least one T-shaped slot disposed therein that extends inward from an opening in the outer surface to define a core, wherein the opening is more narrow than the core;
providing an elongated integral clamp member that comprises
a lower surface, an upper surface opposite the lower surface, a first end, and a second end opposite the first end,
a connected end that is located at the first end and extends from the lower surface to the upper surface,
a first arm that extends from the connected end to the second end, wherein the first arm defines a bolt down region of the lower surface that extends from the first end, and a corresponding clamping region that extends from the bolt down region to the second end, and
a second arm that extends from the connected end to the second end, wherein the second arm defines the upper surface that extends from the first end to a corresponding clamping region at the second end,
wherein a gap is defined between the first arm and the second arm, wherein the gap extends from the second end to the connected end, and wherein the gap is configured to accept the linear motion guide track,
wherein the first arm and the second arm are disposed in substantially parallel planes within the corresponding clamping region,
wherein each of the arms further comprise a plurality of corresponding conduits that extend from the upper surface to the lower surface, wherein the plurality of corresponding conduits are normal to the lower surface and to the parallel planes, wherein the plurality of conduits line up relative to each of the arms through the gap, and wherein the plurality of conduits are located along the length of the elongated integral clamp member;
inserting a plurality of nuts into the T-shaped slot, wherein the plurality of nuts are configured to resist an application of a force from the core of the slot outward toward the slot opening;
aligning the elongated integral clamp member with the T-shaped slot;
inserting a linear motion guide track into the gap;
inserting a plurality of bolts through the plurality of conduits and into the plurality of nuts; and
tightening the plurality of bolts, thereby causing a clamping force that is resisted by the nuts, thereby securing the bolt down surface of the elongated clamp member against the outer surface of the support base extrusion, and causing the gap to narrow, wherein the linear motion guide track is clamped between the first arm and the second arm.

10. The method of claim 9, further comprising the steps of:
providing a beam extrusion having at least one T-shaped beam slot disposed therein that extends inward from an opening in the beam extrusion to define a core, wherein the opening more narrow than the core;
providing at least one guide wheel assembly, wherein each of the at least one guide wheel assemblies comprise
a track bar that is slidably inserted with the T-shaped slot of the beam extrusion, and
a guide wheel that is rotatably coupled to the track bar; and
geometrically coupling the guide wheel with the linear motion guide track, wherein the beam extrusion is linearly movable over the axial distance of the linear motion guide track said.

11. The method of claim 9, wherein the elongated integral clamp member further comprises a raised area groove that extends from the bolt down region of the lower surface, and wherein the step of aligning the elongated integral clamp member to the T-shaped slot comprises aligning the raised area groove to either side of the T-shaped slot.

12. The method of claim 9, wherein the elongated integral clamp member is formed by extrusion.

13. The method of claim 9, wherein the elongated integral clamp member is formed by metal injection molding.

* * * * *